Patented Apr. 4, 1939

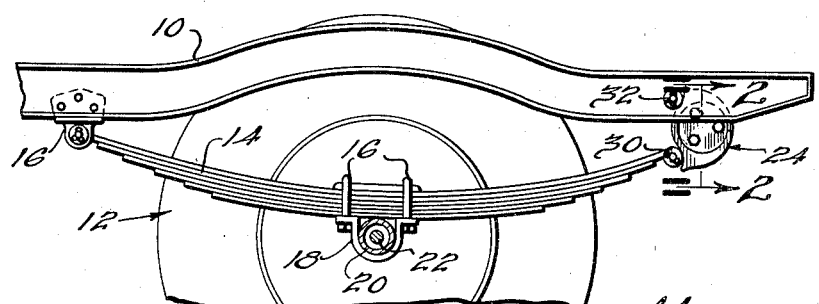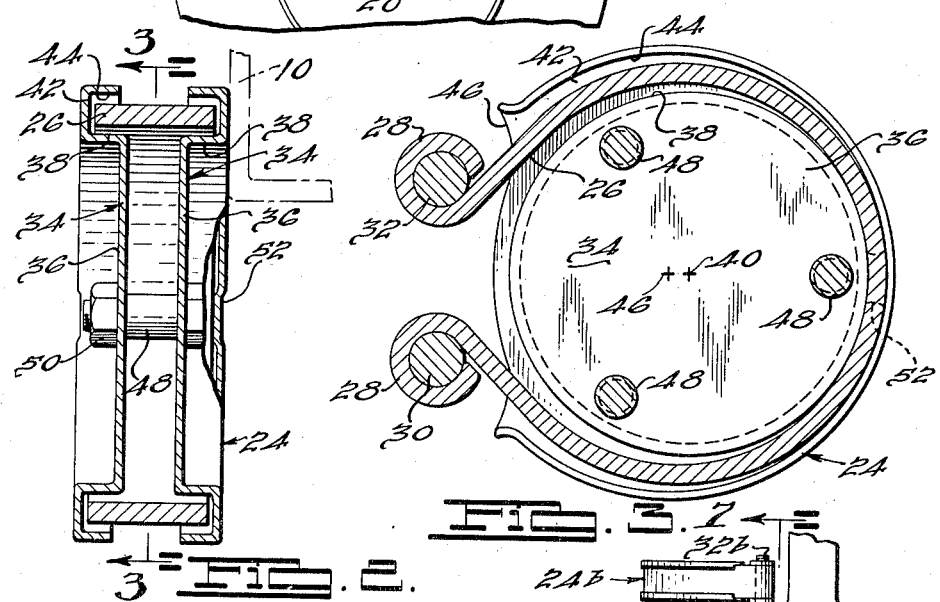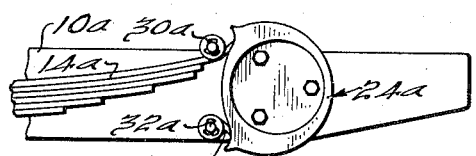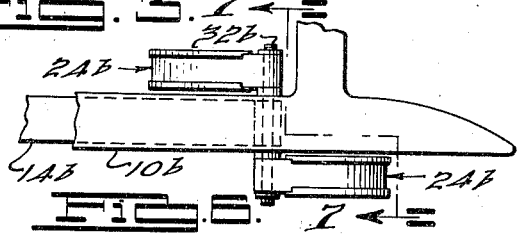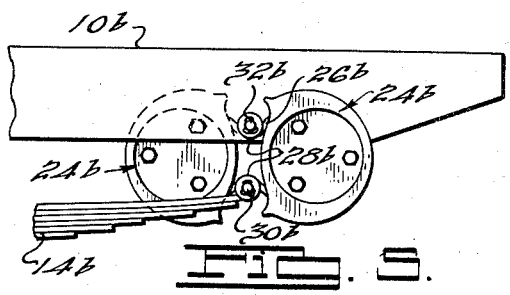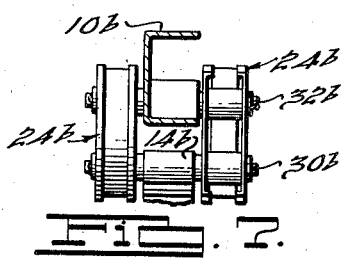

2,153,196

UNITED STATES PATENT OFFICE 2,153,196

SPRING UNIT

Borge Martins, Copenhagen, Denmark

Application October 8, 1937, Serial No. 168,073
In Sweden October 20, 1936

6 Claims. (Cl. 267—46)

This invention relates to springs and particularly to a spring unit that may be employed in an auxiliary capacity in connection with a load carrying spring having a normal load carrying capacity greater than that of the spring unit. While in general the present invention is adapted to a relatively wide range of uses, it is particularly adaptable for use in connection with the spring suspensions of motor vehicles, and for that reason the present description will be limited to its use in connection with motor vehicles, its use in other fields being apparent to those skilled in the art from the description contained herein.

Objects of the invention include the provision of an auxiliary spring device which will increase the resilient or elastic range of a conventional leaf spring; the provision of means to absorb all dynamic forces arising from sudden excessive shocks which might otherwise damage a conventional leaf spring; the provision of an auxiliary spring unit adapted to be inserted in place of the usual shackle employed in connection with a conventional semi-elliptic multiple leaf spring employed as a spring suspension means of a motor vehicle, the spring unit being so constructed and arranged as to be effective particularly when the vehicle is in unloaded or slightly loaded condition; the provision of a spring unit including a housing providing a pair of substantially circular but eccentrically arranged tracks, and a more or less circularly shaped spring arranged between the tracks, the spring having free ends adapted to be connected to relatively movable parts and the springs adapted to progressively contact one or the other of the tracks during relative movement between the parts depending upon the direction of such movement; and the provision of a spring unit including an approximately circularly shaped leaf spring having free ends and eyes formed at such free ends together with an associated track element, the spring and the track element being so constructed and arranged that force applied to the free ends of said leaf spring tending to move such ends out of their normal free relation tends to cause a progressive contact between the spring and the track element whereby to shorten the effective length of the spring and thereby effect a stiffening of the action of the same.

Other objects include, in combination with a motor vehicle having a semi-elliptic leaf spring adapted to yield when the vehicle is in loaded condition to cushion the movement of the load and the spring being of such strength as to provide a small degree of resiliency when the vehicle is in loaded condition, an auxiliary spring unit interconnecting the semi-elliptic spring and the load carrying portion of the vehicle so constructed and arranged as to be operative to resiliently support such portion when the vehicle is in unloaded condition, and in which the rate of resistance of the spring unit increases as the load on the vehicle is increased; and the provision of an auxiliary spring unit for use in series with the usual load carrying springs of a motor vehicle so constructed and arranged as to be particularly sensitive to light variations in load on the vehicle and to shocks to which the vehicle is subjected and which serves in a shock absorbing capacity during the rebound movement between the vehicle wheels and the load carrying portion thereof.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Figure 1 is a fragmentary vertical sectional view taken through the rear axle of a motor vehicle, showing the connection between the wheel and the frame thereof including a spring unit embodying the present invention;

Fig. 2 is an enlarged vertical transverse sectional view taken on the line 2—2 of Fig. 1;

Fig. 3 is a sectional view taken on the line 3—3 of Fig. 2;

Fig. 4 is a fragmentary view similar to the view shown in Fig. 1 but illustrating a slightly different arrangement of the spring unit embodying the present invention;

Fig. 5 is a view similar to Fig. 1 but illustrating the employment of a pair of the spring units embodying the present invention;

Fig. 6 is a top plan view of the construction shown in Fig. 5; and,

Fig. 7 is a vertical sectional view taken on the line 7—7 of Fig. 6.

The device embodying the present invention is, in the broader sense, an adaptation of the general principles disclosed in my co-pending application of the United States filed August 28, 1936, for Improvements in spring suspension, Serial No. 98,272. The device disclosed in said co-pending application is designed for use as the main spring suspension means of a vehicle, while the device constituting the present invention is an improved form of auxiliary spring for use in connection with and in addition to conventional leaf springs such as are employed as the main spring suspension means of conventional motor vehicles.

A device embodying the present invention may be installed on any existing auto or vehicle employing leaf springs without requiring any other changes to the existing suspension arrangement except to replace the present shackle member with my improved device. It may be substituted for either the front or rear shackles of the leaf spring or both, and furthermore one or two of the devices may be used at each end as the case may dictate.

The known forms of leaf spring suspension for motor vehicles, and particularly those of the load carrying type as, for instance, trucks, and busses, without auxiliary spring suspension devices all have the very serious disadvantage that they are invariably too stiff for the vehicle without load, with the result that the vehicle rides "hard" when not loaded. The springs, therefore, really do not function with their full resiliency or elasticity until the vehicle is fully loaded.

Many and varied auxiliary devices have been brought forth in the past, the purposes of which were to overcome the poor riding qualities and other disadvantages of the leaf springs, but as far as it is known, without success and none of them based on the so-called "progressive principle" of the present invention which alone can provide the desired resiliency without sacrificing in any way the load carrying capacity of either the main or the auxiliary spring.

The auxiliary spring of the present invention will overcome all the disadvantages of conventional leaf springs and auxiliary devices because it operates on what may be termed a "progressive principle" and at the same time "proportional to the wheel pressures". It provides maximum elasticity when the vehicle is without load since the free ends of the auxiliary spring are long and flexible, but the elasticity progressively decreases as the vehicle is loaded because the free ends of the auxiliary spring become progressively shorter, which is all essential if it shall carry the increased load or shocks. However, as the elasticity of the auxiliary spring decreases the main or leaf spring commences to act and becomes elastic so that the combined elasticity of the two remains substantially constant, resulting in an improved and more nearly perfect riding condition under all conditions of load and shock. For the higher wheel pressures the auxiliary spring need have very little elasticity because the leaf spring then functions efficiently in itself and has the desired elasticity.

It must not be overlooked, however, that the auxiliary spring reacts at all times and that while its elasticity progressively decreases as the wheel pressure increases, it nevertheless never decreases to the point where no further elasticity remains. This is of considerable advantage since the auxiliary spring can, therefore, yield in response to excessive dynamic shocks, thereby strengthening the main spring sufficiently to withstand dynamic forces without failing.

Referring now to Fig. 1 which illustrates the rear portion of a motor vehicle, the numeral 10 indicates the rear end of one of the chassis frame side rails which is adapted to be supported by a wheel indicated generally at 12. In accordance with conventional practice a conventional type of multiple leaf spring 14 is pivotally connected at its forward end to a bracket 16 rigidly secured to the frame side member 10. Adjacent its center the spring 14 is connected by suitable U bolts 16 and clamping bracket 18 to the rear axle housing 20 within which the driving axle 22 for the wheel 12 is suitably housed and mounted in a conventional manner. In conventional constructions the rear end of the spring 14 would be connected to the frame side member 10 at a point above its rear end by means of a shackle (not shown) but in accordance with the present invention such shackle is replaced by an auxiliary spring unit indicated generally at 24 which not only serves the same purpose as a conventional shackle but in addition increases the range of resiliency of the spring suspension for the vehicle in such a manner as to result in easy riding qualities of the vehicle when devoid of load or when under a light load.

Referring now to Figs. 2 and 3 in which the details of construction of the auxiliary spring unit 24 are disclosed with the auxiliary spring in its preferred normal condition when the vehicle is unloaded, it will be noted that the device includes an approximately circular spring element 26 having free ends and which free ends are each formed to provide an eye 28. A bolt 30 secured in the lower eye 28 is pivotally received by the rear end of the spring 14, and a bolt 32 secured in the upper eye 28 is suitably mounted for pivotal movement upon the frame side member 10.

A partial housing for the spring 26 is provided and comprises a pair of members 34 which members are identical to one another but are arranged in opposed relation. Preferably the members 34 are formed from sheet metal but obviously may be made in any desired manner. Each member 34 comprises a planular web portion 36 flanged outwardly at its periphery to provide on its radially outer surface a cylindrical track 38 the axis of which is arranged at 40 as indicated in Fig. 3. The outer marginal edge of the flange forming the track 38 is joined to a radially extending flange portion 42 which in turn terminates in an inwardly extending flange forming a radially inwardly presented cylindrical track 44 which as illustrated in Fig. 3 is eccentric with the track 38 and has its axis at 46. Thus the two tracks 38 and 44 are both cylindrical but eccentric to each other. The tracks 44 at the point of greatest eccentricity between the tracks is cut-away over a relatively generous distance to provide a mouth 46 for projection of the ends of the spring 26. The amount of eccentricity between the tracks 38 and 44 is preferably equal to the thickness of the spring 26 so that when received between the tracks 38 and 44 it will be substantially maintained against movement at such point.

As previously mentioned the housings 34 are arranged in opposed relation and the spring 26 is received at its margins in the grooves formed by the tracks 38 and 44 and connecting flange 42 of each member 34. In order that the sides of the spring 26 will not rub against the inner faces of the flanges 42 each cooperating pair of members 34 are secured together by means of shouldered studs 48 the enlarged portions of which are disposed between the webs 36 of a pair of cooperating members 34 and the reduced threaded end portions of which project through such webs 36 and outwardly thereof are provided with suitable nuts 50.

The spring 26, preferably having a relatively close fit between corresponding tracks 38 and 44 at the point of such minimum distance between such tracks opposite the center of the mouth 46, will ordinarily be maintained against sliding movement with respect to the tracks 38 and 44, but any possibility of such movement may be eliminated if desired by insetting the flanges 42 of the members 34 for a short distance on either side of the point of minimum distance between the tracks 38 and 44 as indicated at 52 in Figs. 2 and 3, so that the spring 26 will be clamped by the studs 48 between the opposed flanges 42 at such location. This also has the advantage of accurately centering the spring 26 with respect to both flanges 42.

Preferably the spring 26 is made of such strength that when the vehicle to which it is adapted is stationary and unloaded the spring assumes the relative position indicated in Fig. 3 in which it will be noted that except at the point opposite the mouth 46 where it is clamped between the tracks 38 and 44 it extends in approximately equally spaced relation with respect to both tracks, and because of the eccentric relation of the tracks this spacing increases from the anchored portion of the spring 26 toward the free ends thereof.

If the motor vehicle to which the spring unit 24 is adapted is assumed to be a truck or other similar type of load carrying vehicle, then the spring 14 when the vehicle is in unloaded condition will be too stiff to readily respond to slight variations in the road surface as the vehicle travels over the same, but with the spring unit 24 properly designed the spring unit will be effective to resiliently support the load carrying portion of the vehicle on the wheels under such conditions and its resiliency will be effective from an unloaded condition of the vehicle to a partly loaded condition at which the main springs 14 will really become effective for their intended purpose.

Consequently, when the vehicle is in unloaded condition and travelling over a road, should the wheel 12 strike a small protuberance, the wheel 12 in attempting to move upwardly against the weight of the load carrying portion of the vehicle will tend to move the eyes 28 of the spring 26 towards each other and, where the spring 26 is properly designed such movement will occur. In a similar manner should the wheel 12 under such circumstances drop into a small depression in the road surface the eyes 28 will tend to separate from one another and will actually separate from one another under the circumstances assumed. The eyes 28 in receding from one another or approaching one another during such occurrences as above mentioned will, of course, cause a compression or expansion of the spring 26 and where the nature of the pressure of variations resulting from the wheel 12 meeting a relatively small protuberance or depression in the road surface is small the spring 26 may bend over its full length beyond its anchored center portion without actually increasing its length of contact with either of the tracks 38 or 44. However, where the variations in pressure acting on the eyes 28 of the spring 26 due to any irregularities in road surface are sufficiently great the spring 26 in bending to accommodate such variations in pressures will cause the spring to wrap around the inner track 38 or wrap into the outer track 44 an amount corresponding with the amount of such pressure differences.

As will be readily understood by those skilled in the art as the spring 26 wraps itself upon the track 38, for instance, in response to a pressure tending to move the eyes 28 towards one another, only that portion of the spring 28 remaining out of contact with the track 38 will be effective to permit a further increase in pressure to move the eyes 28 towards one another. Any shortening of the effective free lengths of the spring 26 under an increase of pressure as thus described automatically has the effect of increasing the rate of resistance of the spring 26 to further compressive movement. Consequently, while the spring 26 may be exceedingly soft or yieldable when positioned in relation to the tracks 38 and 44 as illustrated in Fig. 3, under the influence of increase in load upon it causing it to progressively wrap itself around the track 38 or into the track 44 in proportion to the load or shock to be resisted, and, accordingly, its effective rate of deflection decreases at a substantially rapid rate and will disappear substantially entirely in event the pressure is sufficiently great to cause it to become completely wrapped upon the track 38 or into the track 44.

As previously mentioned, the point at which the spring 26 becomes completely wrapped around the track 38 and the resiliency of the auxiliary spring unit is thereby nullified may be controlled to blend into the resilient characteristics of the main spring 14 at any desired point. Preferably, however, it is so designed that the main spring 14 begins to function in its desired manner sometime prior to the load on the vehicle at which the effectiveness of the auxiliary device 24 is nullified as far as resilient supporting effect of the load is concerned. The point at which the effectiveness of the unit 24 fades out during an increase of load on the vehicle may, of course, be varied by varying the width or thickness of the spring 26, by varying its diameter or by varying the diameter and the eccentricity of the tracks 38 and 44. The fact that the wheel and spring pressures are always directly proportional makes it possible to compute the correct size of spring required in my device to take care of the minimum and maximum requirements and give substantially uniform elasticity under all conditions.

In addition to its function of resiliently supporting an unloaded or partially loaded vehicle, the spring unit 24 has the further function of acting in a shock absorbing capacity during rebound conditions of the vehicle wheels. For instance, if the vehicle in loaded or partly loaded condition and the wheel 12 passes over a bump of relatively large proportions in the roadway, the wheel 12 in moving upwardly will tend to compress the spring 14 and throw the load of the vehicle upwardly. As soon as the projection has been passed over by the wheel 12, the spring 14 will tend to throw the wheel violently downwardly towards the road surface. In conventional constructions equipped with shackles instead of units such as 24, if under such circumstances the height of the projection was sufficient to permit the wheel 12 in moving downwardly after passing over it to pass beyond the neutral or rest position of the spring 14, the effect would be to pull the load carrying portions of the vehicle downwardly with relatively great force. Where the vehicle is equipped with units such as 24 under the same conditions, however, after the wheel has passed over the projections and moves downwardly away from the load carrying portion of the vehicle as the spring 14 approaches its normal condition under no load condition the spring 26 will begin to unwrap from the track 38 and will eventually begin to wrap into the track 34. It will thus permit a greater relative vertical movement between the wheel 12 and the frame 10 and will yieldingly resist the rebounding movement of the wheel with increasing effectiveness as the spring 26 becomes further wrapped into the track 44. Accordingly, the unit 24 operates in a shock absorbing capacity under such conditions. Likewise, when the vehicle is loaded to such an extent as to effect a full wrapping of the spring 26 around the track 38, variations in pressure exerted on the main spring 14 caused by the vehicle passing over small irregularities in the road surface will permit unwrapping of the spring 26 from the track 38 to a greater or lesser extent and thus aid in cushioning the action between the wheels and the load carrying portion of the vehicle.

As previously mentioned it is possible to arrange the auxiliary spring unit 24 so that increased load on the vehicle tends to separate the eyes 28 instead of urging them together as in the constructions shown in Figs. 1, 2 and 3, such arrangement corresponding with some conventional shackle arrangement in which the shackles extend downwardly from the rear end of the main vehicle spring. Such an arrangement is shown in Fig. 4 in which parts corresponding to the parts shown in Figs. 1, 2 and 3 are indicated by the same numerals except that such numerals are followed by the sub-letter "a". The construction of the units 24a are identical to the units 24 previously described with the exception that the springs 26 must, of course, be varied in their construction and initial configuration so that when the load, which now tends to separate the eyes 28, is applied to the vehicle, it will tend to unwrap the spring into the outer track corresponding to the track 44 previously described, and when the vehicle is in unloaded condition the spring 26a will preferably assume the same medial relation with respect to the inner and outer tracks as is illustrated in Fig. 3. Otherwise the construction is identical and the operation is identical except that the spring instead of wrapping upon the inner track corresponding to the track 38 upon increase in load will wrap into the outer track corresponding to the track 44, and upon rebound conditions the spring will wrap upon the inner track instead of into the outer track.

It is, of course, possible to use more than one unit 24 at one end of a spring such as 14 when considered necessary or desirable. It may be desirable under some circumstances in order to eliminate the possibility of any twisting action on the unit 24 because of its offset relation with respect to the center of the main spring as in the constructions illustrated in Figs. 1 to 4, inclusive. Such an arrangement is shown in Figs. 5, 6 and 7 in which the same numerals are employed for designating the same parts as illustrated in Figs. 1, 2 and 3 except that such numerals are followed by the sub-letter "b". The arrangement is identical to that disclosed in Fig. 1 including one unit positioned outwardly of the spring 14b and is arranged to move the free ends of the spring 26b towards each other upon increase in load on the vehicle, but in addition an added unit 24b is positioned on the inner side of the spring 14b, this second unit 24b being identical to the first unit 24 described except that it is shown reversed in position in the particular instance shown, although this last feature is not necessary. In other words, the main body portion of the inner unit projects forwardly of the vehicle with respect to its corresponding spring ends instead of rearwardly as in the case of the first mentioned spring unit. Also in this case the bolts 30b and 32b corresponding to the bolts 30 and 32 previously described project through the corresponding eyes 28 of both units 24b and the end of the spring 14b is pivotally received upon the bolt 30b between the lower eyes 28b of both units 24b. The upper bolt 32b also projects through both the upper eyes 28b of both units 24b and is pivotally mounted between such eyes upon the frame side member 10b. Thus with this arrangement the spring 14b and the frame 10b is pivotally connected to the bolts 30b and 32b respectively intermediate the units 24b. The springs 26b in this case may, of course, be of a different strength than the spring 26 previously described inasmuch as the corresponding amount of resiliency is thus afforded in this case by two springs instead of one as in the former case, but in any event it will be understood that the springs 26, 26a or 26b as the case may be will be designed in each individual case to effect the desired resiliency of the unit. Obviously the arrangement illustrated in Figs. 5, 6 and 7, that is with a unit on both the inner and outer sides of the spring 14, may be adapted to either the construction illustrated in Fig. 1 or to that illustrated in Fig. 4.

It will also be understood that the specific construction and arrangement of the parts shown in the illustrated preferred forms of the invention are capable of many modifications and changes and, accordingly, that formal changes may be made in the specific embodiment of the invention described without departing from the spirit or substance of the broad invention, the scope of which is commensurate with the appended claims.

What is claimed is:

1. In combination, a leaf spring, an auxiliary circular spring means connected to said leaf spring, a co-operative bearing surface along which said means may progressively contact or bear in response to pressures exerted on the leaf spring and another co-operative surface opposite to the first named surface along which the spring may also progressively contact or bear in response to opposite pressures exerted on the leaf spring.

2. An auxiliary spring device for operative association with a leaf spring comprising a circular spring means, a co-operative bearing surface along which said means may progressively contact or bear to vary the free length of same in response to pressures exerted on the leaf spring and another co-operative surface opposite to the first named surface along which the spring may also progressively contact or bear to vary the free length of same in response to opposite pressure exerted on the leaf spring.

3. In combination, a support, a leaf spring, an auxiliary circular leaf spring the ends of which are provided with eyes, one of said eyes being connected to the support and the other to one end of the leaf spring, and a two-piece housing having a spaced pair of peripheral flanges along which said spring may progressively contact in response to pressure applied to said eyes.

4. An auxiliary spring device for operative association with a leaf spring comprising a circular leaf spring, the ends of which are provided with eyes, a housing formed of a pair of complementary stampings each having a spaced pair of peripheral flanges along which said spring may progressively contact in response to pressure applied to said eyes, and means for clamping together the two-piece housing with the flanges in alignment.

5. An auxiliary spring device for operative association with a leaf spring comprising a circular housing having an inner peripheral surface and an outer peripheral surface eccentric to the first named surface, and along either of which a spring may progressively contact or bear, a circular leaf spring operatively associated with said surfaces and having eyes provided on the free ends thereof and means for clamping said spring within said housing to maintain their relative position.

6. An auxiliary spring device for operative association with a leaf spring comprising a two-piece circular housing, each half of which is provided with an inner flange and an outer flange eccentric to the first named flange and along either of which a spring may contact or bear, a circular leaf spring operatively associated with said flanges and having eyes provided on the free ends thereof and means to clamp together the two-piece housing to retain the spring in fixed relation to the housing.

BORGE MARTINS.